United States Patent
Kalinhoff

(10) Patent No.: US 11,821,533 B2
(45) Date of Patent: Nov. 21, 2023

(54) AIR RELEASE VALVE WITH LOW PRESSURE SEALING

(71) Applicant: A.R.I. Fluid Control Accessories Ltd., Kfar Charuv (IL)

(72) Inventor: Eitan Kalinhoff, Kfar Vradim (IL)

(73) Assignee: Aquestia Ltd., Kfar Charuv (IL)

( * ) Notice: Subject to any disclaimer, the term of this patent is extended or adjusted under 35 U.S.C. 154(b) by 0 days.

(21) Appl. No.: 17/642,690

(22) PCT Filed: Sep. 24, 2019

(86) PCT No.: PCT/IB2019/058085
§ 371 (c)(1),
(2) Date: Mar. 13, 2022

(87) PCT Pub. No.: WO2021/058999
PCT Pub. Date: Apr. 1, 2021

(65) Prior Publication Data
US 2022/0316614 A1  Oct. 6, 2022

(51) Int. Cl.
*F16K 24/04* (2006.01)
*F16K 15/14* (2006.01)

(52) U.S. Cl.
CPC .......... *F16K 24/042* (2013.01); *F16K 15/148* (2013.01)

(58) Field of Classification Search
CPC .... F16K 15/148; F16K 15/16; F16K 15/1825; F16K 15/1845; F16K 24/042; F16K 24/048; F16K 31/20; F16K 31/24; E03F 5/08
See application file for complete search history.

(56) References Cited

U.S. PATENT DOCUMENTS

| 812,451 A | 2/1906 | Rice |
| 2,893,412 A | 7/1959 | Fox |
| 6,513,541 B1 * | 2/2003 | Herlihy ................. F16K 24/042 137/430 |

(Continued)

FOREIGN PATENT DOCUMENTS

| CN | 106678429 A * | 5/2017 |
| DE | 102019216294 A1 * | 4/2021 |

(Continued)

OTHER PUBLICATIONS

International Search Report, PCT/IB2019/058085, dated May 26, 2020.
Spanish Search Report, ES202290028, dated Apr. 22, 2022.

*Primary Examiner* — Hailey K. Do
(74) *Attorney, Agent, or Firm* — Dekel Patent Ltd.; David Klein

(57) ABSTRACT

An air release valve (10) includes a housing (11) fluidly connectable to a water line, a valve seat (12) secured to a portion of the housing (11) and formed with one or more air exit passageways (14), a seal (18) formed as a spring disc and including a stem (28) slidingly engaged with the valve seat (12), and a weight (20) coupled to the seal (18). In a sealed configuration the seal (18) presses against the valve seat (12) and seals the one or more air exit passageways (14) from air passing therethrough and in an open configuration the seal (18) is moved by the weight (20) so that the seal (18) is not pressed against the valve seat (12) and allows passage of air through the one or more air exit passageways (14).

8 Claims, 2 Drawing Sheets

(56) References Cited

U.S. PATENT DOCUMENTS

| | | | | |
|---|---|---|---|---|
| 8,360,105 | B2* | 1/2013 | Cashen | F16K 24/06 |
| | | | | 137/526 |
| 10,006,555 | B2* | 6/2018 | Arazi | F16K 31/06 |
| 10,173,522 | B2* | 1/2019 | Marini | B60K 15/04 |
| 2006/0225785 | A1 | 10/2006 | Oosaki | |
| 2018/0194220 | A1 | 7/2018 | Sugiyama | |

FOREIGN PATENT DOCUMENTS

| | | |
|---|---|---|
| ES | 2293515 T | 5/2000 |
| ES | 2183074 T | 3/2003 |
| ES | 2328742 T | 11/2009 |
| FR | 2905745 | 3/2008 |
| JP | 2000-145991 | 5/2000 |
| KR | 800000783 Y | 6/1980 |

* cited by examiner

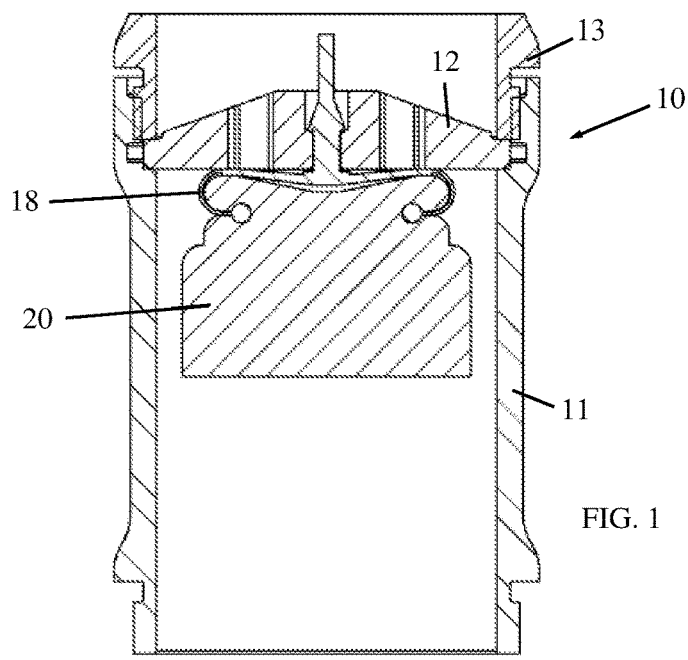
FIG. 1
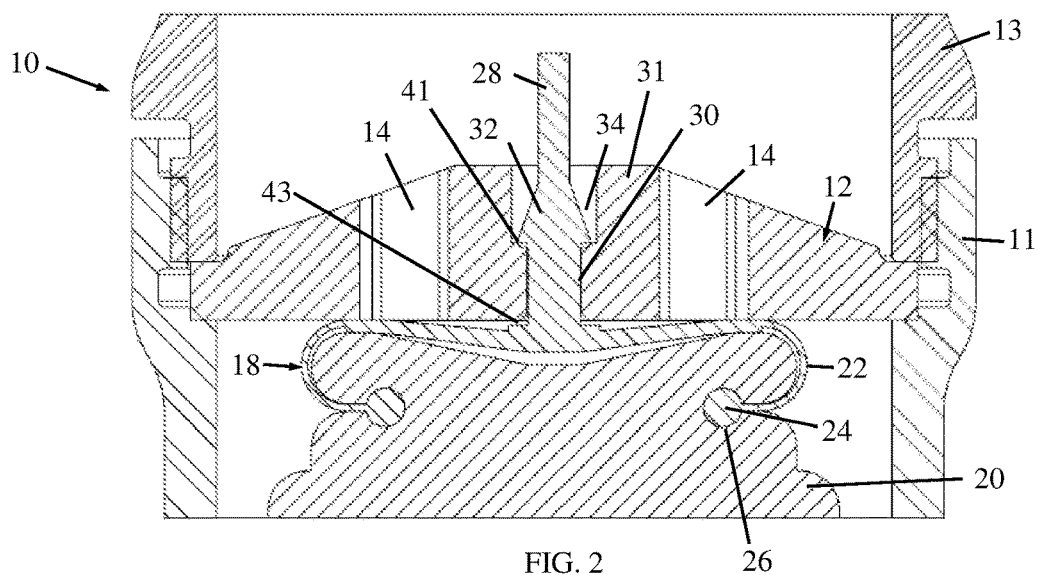
FIG. 2
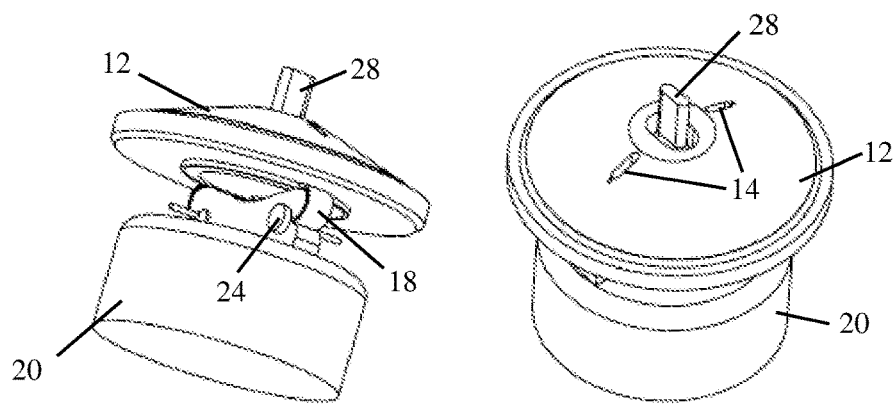
FIG. 3A
FIG. 3B

AIR RELEASE VALVE WITH LOW PRESSURE SEALING

FIELD OF THE INVENTION

The present invention relates generally to air release valves, and particularly to an air release valve that seals and prevents air from exiting even at low pressures.

BACKGROUND OF THE INVENTION

Fluid flow valves which include air release or air purge features are well known. Such valves are typically located in liquid pipes or conduits (such as sewage pipes) and release air or other gases to avoid air or gas locks which otherwise interfere with the flow of liquid through the pipe. (The term air release valve is used interchangeably with the term gas release valve; that is, the valve may be used with any kind of gas or gas mixture.)

A typical air release valve has an orifice (aperture) for the release of gas, and the orifice is opened and closed by a float, or alternatively by a linkage mechanism operated by the float. During normal flow conditions, the float is forced by the flowing liquid sealingly against the outlet orifice. If air accumulates in the conduit, the float moves downwards under its own weight, which opens the outlet orifice to vent air or gas.

However, a disadvantage of prior art air release valves is that it is difficult to seal the exit (purge) of air to the outside atmosphere when there is very low pressure in the water line (pipe line). The very low pressure is typically insufficient to close the seal in prior art valves.

SUMMARY OF THE INVENTION

The present invention seeks to provide an improved air release valve, as is described more in detail hereinbelow. The valve of the invention seals and stops the flow of air outwards when the pressure in the water line (pipe line, the terms being used interchangeably) is very low, even when there is almost zero relative pressure (pressure in the line relative to the atmospheric pressure). The air release valve of the present invention is thus significantly more reliable than valves of the prior art.

There is thus provided in accordance with an embodiment of the present invention an air release valve including a housing fluidly connectable to a water line, a valve seat secured to a portion of the housing and formed with one or more air exit passageways, a seal formed as a spring disc and including a stem slidingly engaged with the valve seat, and a weight coupled to the seal, wherein in a sealed configuration the seal presses against the valve seat and seals the one or more air exit passageways from air passing therethrough and in an open configuration the seal is moved by the weight so that the seal is not pressed against the valve seat and allows passage of air through the one or more air exit passageways.

The seal may include attachment structure which is attached to the weight. The attachment structure may include two or more arcuate arms with fasteners that are secured in crevices formed in the weight.

The seal stem may be received in an aperture formed in the valve seat.

BRIEF DESCRIPTION OF THE DRAWINGS

The present invention will be understood and appreciated more fully from the following detailed description, taken in conjunction with the drawing in which:

FIG. 1 is a simplified sectional illustration of an air release valve, constructed and operative in accordance with a non-limiting embodiment of the present invention;

FIG. 2 is an enlarged sectional illustration of the air release valve;

FIGS. 3A and 3B are simplified pictorial illustrations of the weight (float), seal and valve seat components of the air release valve;

DETAILED DESCRIPTION OF EMBODIMENTS

Figure 4:
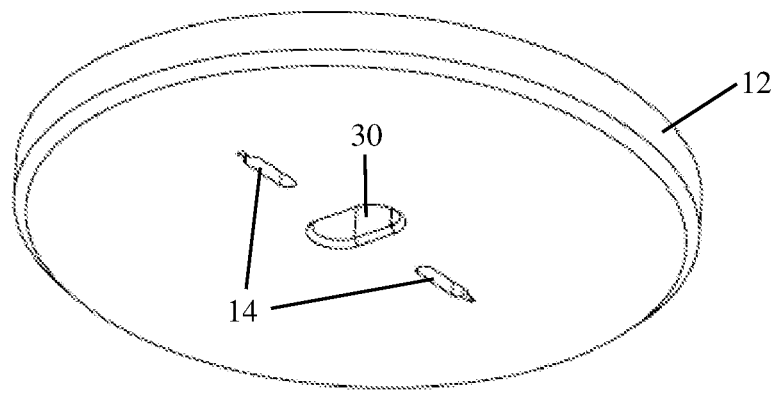
FIG. 4 is a simplified illustration of the valve seat showing air exit passageways.

Reference is now made to FIGS. 1 and 2, which illustrate an air release valve 10, constructed and operative in accordance with a non-limiting embodiment of the present invention.

The air release valve 10 includes a housing 11 which is fluidly connectable to a water line or pipe line (not shown), as is known in the art. A valve seat 12 is secured to a portion (typically the upper portion) of housing 11, such as by means of a cover 13 which clamps down on valve seat 12. Cover 13 is sealingly attached to housing 11, for example, by threaded connection or by a snug O-ring fit. Housing 11 has an inlet 5 and an exit 6.

The valve seat 12 is formed with one or more air exit passageways 14 (there are two diametrically-opposed elongated passageways in the illustrated embodiment, that is, two passageways on opposite sides of the central axis of the valve seat 12). As seen in FIGS. 2 and 3A, valve seat 12 may conical so that it is thicker in a central portion thereof and gradually narrower in a radially-outward direction. The air exit passageways 14 may be formed in the thicker central portion of valve seat 12, but could alternatively be formed at other places in the valve seat.

The air release valve 10 includes a seal 18 which is constructed of an elastomeric material and formed as a Belleville washer or umbrella seal, that is, a spring disc or conical spring disc and the like, all the terms being used interchangeably. Seal 18 is coupled to a weight 20, which may also be referred to as a float. Weight 20 may be made of any suitable material, such as metal or plastic.

Figure 5:
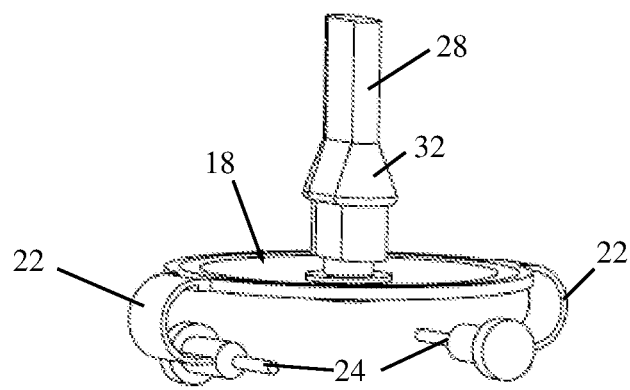
FIG. 5 is a simplified illustration of the seal with attachment structure to the weight and a seal stem which couples to the valve seat, in accordance with a non-limiting embodiment of the present invention.

As seen in FIG. 2, seal 18 includes attachment structure 22 which is attached to the weight 20. For example, as seen best in FIG. 5, the attachment structure 22 may be two or more arcuate arms 23 with push-fit (e.g., cylindrical) fasteners 24 that are secured in crevices 26 (FIG. 2) formed in weight 20. Seal 18 also includes a seal stem 28, which as seen in FIG. 2, is received in an aperture 30 formed in the central portion 31 of valve seat 12. The stem 28 may be formed with a radially-enlarged protuberance 32, which can sit on a counterbore 34 formed in aperture 30. In this manner, the stem 28 cannot fall through the valve seat 12.

The operation of air release valve 10 is now described. In a first situation, there is little or no water in the water line. In this situation, weight 20 is at a low position away from the valve seat 12, and the seal 18 moves downwards with weight 20 simply by the force of gravity. The seal 18 and weight 20 are held in place by seal stem 28 resting on the "shelf" of the counterbore 34, as described above. In this position, seal 18 is not pressed against the valve seat 12, so the air exit passageways 14 are not blocked and air can flow through the air exit passageways 14 from the inlet 5 towards exit 6.

In a second situation, water enters inlet 5 and lifts weight 20 to the position shown in FIGS. 1 and 2. In this position, seal 18 is pressed against valve seat 12, thereby sealing the air exit passageways 14 so that air cannot flow through the air exit passageways 14. Airflow from the inlet 5 towards the exit 6 is stopped. The valve of the invention seals and stops the flow of air outwards even when the pressure in the water line is very low, even when there is almost zero relative pressure.

In a third situation, when the water level drops a bit, the seal 18 is pulled down by the weight 20, thereby once again opening the air exit passageways 14, and air flows out of exit 6. This can occur even at very low pressure differences, so the air release valve 10 is a very sensitive device.

It is noted that seal stem 28 can seal against the base of counterbore 34 (as indicated by numeral 41 in FIG. 2), and the base of stem 28 can seal against the central portion 31 of valve seat 12 (as indicated by numeral 43 in FIG. 2).

What is claimed is:

1. An air release valve-comprising:
   a housing fluidly connectable to a water line;
   a valve seat secured to a portion of said housing and formed with one or more air exit passageways;
   a seal formed as a spring disc and comprising a stem slidingly engaged with said valve seat; and
   a weight coupled to said seal, wherein in a sealed configuration said seal presses against said valve seat and seals said one or more air exit passageways from air passing therethrough and in an open configuration said seal is moved by said weight so that said seal is not pressed against said valve seat and allows passage of air through said one or more air exit passageways; and
   wherein said stem is arranged to seal against a central portion of said valve seat.

2. The air release valve according to claim 1, wherein said one or more air exit passageways comprise a pair of diametrically-opposed elongated passageways.

3. The air release valve according to claim 1, wherein said valve seat is conical so that it is thicker in a central portion thereof and gradually narrower in a radially-outward direction.

4. The air release valve according to claim 1, wherein said seal comprises attachment structure which is attached to said weight.

5. The air release valve according to claim 4, wherein said attachment structure comprises two or more arcuate arms with fasteners that are secured in crevices formed in said weight.

6. The air release valve according to claim 1, wherein said seal stem is received in an aperture formed in said valve seat.

7. The air release valve according to claim 6, wherein said seal stem is formed with a radially-enlarged protuberance received in a counterbore formed in said aperture.

8. The air release valve according to claim 7, wherein said stem is arranged to seal against a base of said counterbore.

* * * * *